Sept. 27, 1927.  1,643,682
B. F. SEYMOUR
COMBINED RESILIENT BEARING AND TRANSMISSION
Filed Sept. 24, 1923  2 Sheets-Sheet 2
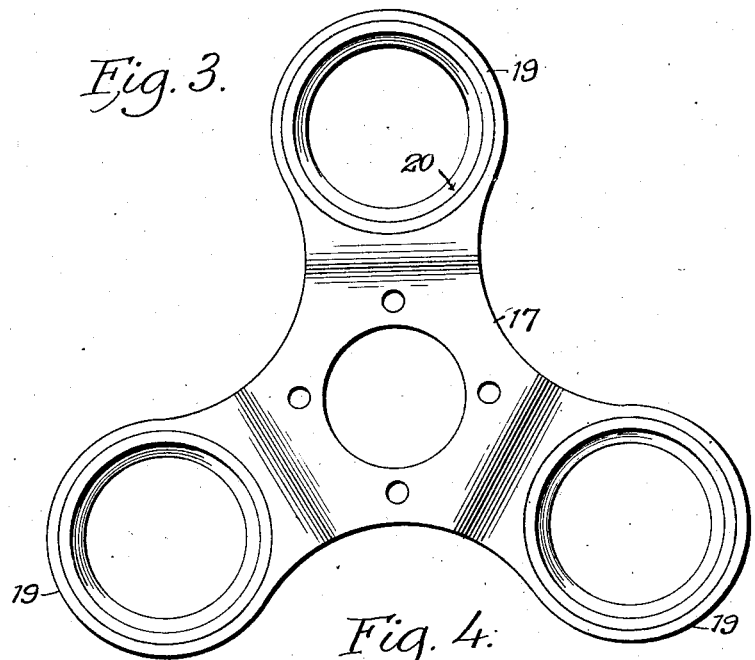
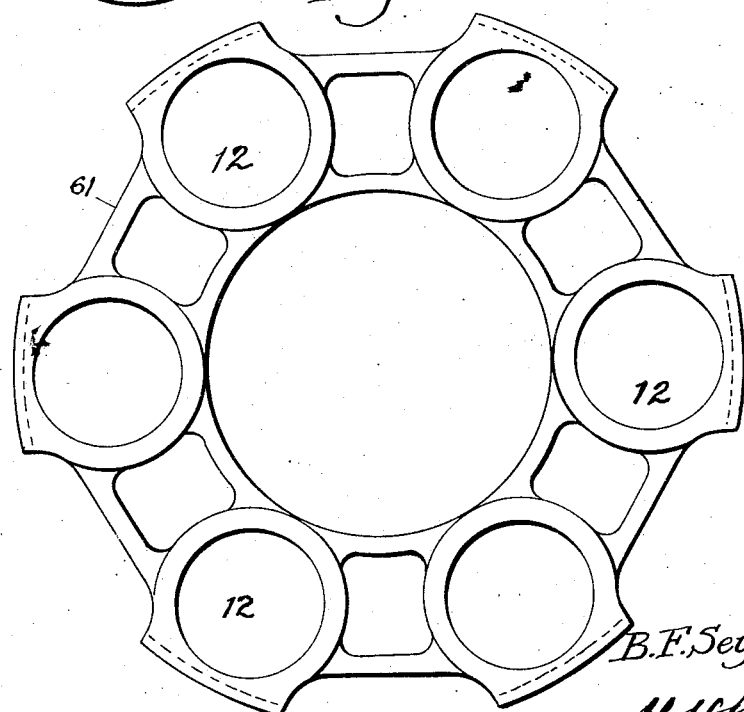
Inventor
B. F. Seymour,
By
Attorney Patented Sept. 27, 1927.

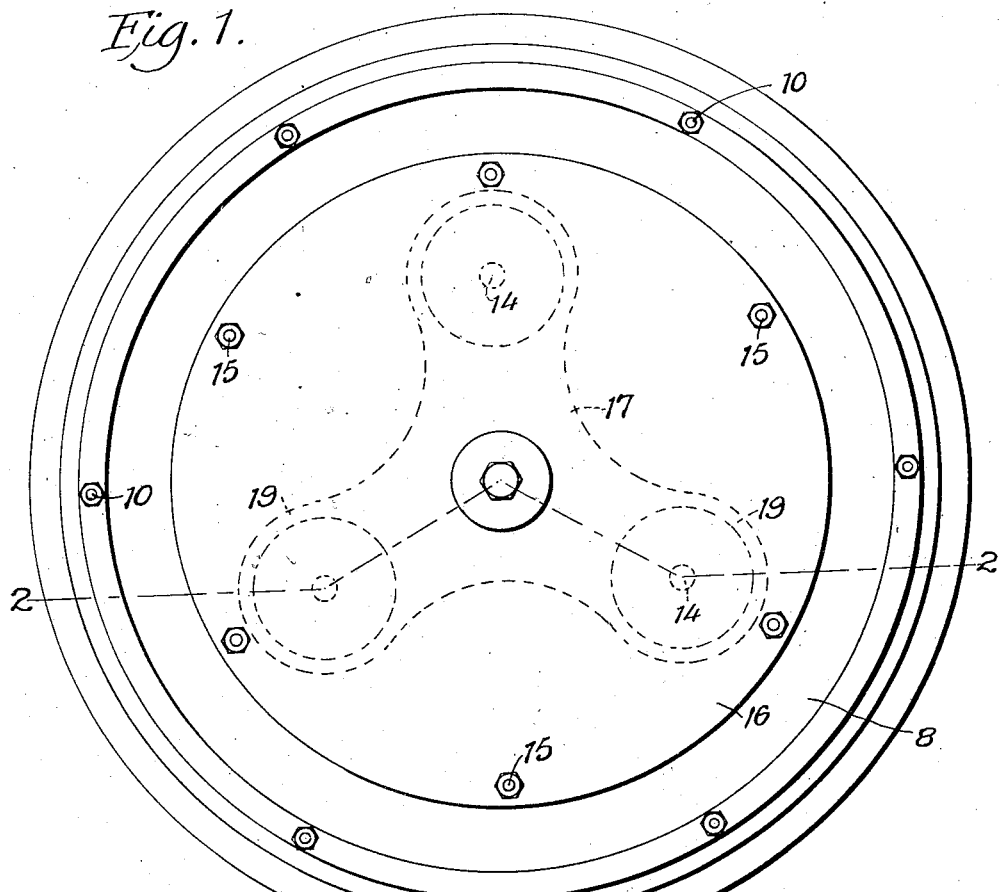
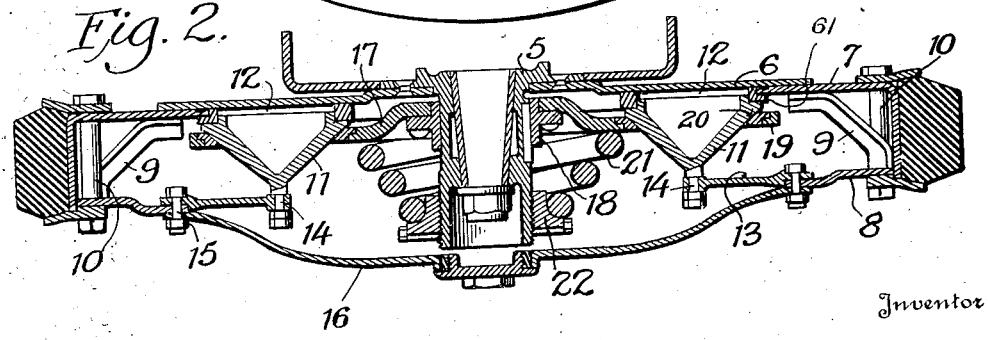

1,643,682

UNITED STATES PATENT OFFICE.

BENJAMIN F. SEYMOUR, OF WASHINGTON, DISTRICT OF COLUMBIA.

COMBINED RESILIENT BEARING AND TRANSMISSION.

Application filed September 24, 1923. Serial No. 664,632.

The present invention relates to resilient transmissions and bearings, more particularly for vehicle wheels, and consists in the combinations and arrangements of elements hereinafter described and particularly set forth in the accompanying claims.

The purpose of the invention is to provide a flexible or resilient transmission between a driving and a driven element adapted to positively transmit the driving force whether said elements are in or out of concentric relation; and one which will readily accommodate itself under all normal working conditions to which said elements may be subjected.

A further purpose of the invention is to provide a combined resilient transmission and bearing for a vehicle wheel to the end that such a wheel may possess the desired resilient qualities and also give the necessary transmission medium between the wheel proper and the motive power of the vehicle.

The construction shown herein is proposed as an improvement or other embodiment of the types of combined resilient transmission and bearing disclosed in my already issued Patents, Nos. 1,462,385, dated July 17, 1923; 1,462,386, dated July 17, 1923; 1,474,122, dated Nov. 13, 1923; 1,476,187, dated Dec. 4, 1923; 1,477,908, dated Dec. 18, 1923; 1,477,909, dated Dec. 18, 1923; 1,477,910, dated Dec. 18, 1923; 1,477,911, dated Dec. 18, 1923; 1,477,912, dated Dec. 18, 1923; 1,525,327, dated Feb. 3, 1925; and 1,620,136, dated March 8, 1927.

The arrangement shown herein is further characterized in that uniformly distributed and co-operable cone elements are provided for the driving and driven element to the end of obtaining equal and uniformly distributed pressure under all working conditions, whereby to obtain maximum efficiency and ease of operation.

The invention is shown by way of illustration in the accompanying drawings wherein:

Figure 1 is a front elevational view of a wheel showing the application of the device thereon.

Fig. 2 is a transverse sectional view taken on the line 2—2 of Fig. 1.

Fig. 3 is a detail view of the hub cone element, and

Fig. 4 is an enlarged detail view of the wheel rim cone carrying element.

Referring to the construction in further detail, and wherein like reference characters designate corresponding parts, the construction consists of a hub portion 5 having a fixed and disk-like hub plate 6 located adjacent the vehicle body; and 7 and 8 designate, respectively, the inner and outer side plates of the wheel rim which has limited movement relative to the wheel hub. The rim plate 7 is disposed in bearing relation against the guide plate 61 (see Fig. 2), and a number of angular bracing elements 9 are located between the rim plates 7 and 8 in the manner shown. Said bracing elements 9 are secured in any suitable manner e. g., by the several bolts 10.

The resilient transmission and bearing device per se consists of a plurality of cone heads 11 suitably secured by their bases within alternate ones of the openings 12 formed in the guide plate 61, as shown in Figs. 2 and 4. The cone elements 11 are triangularly arranged (see Fig. 1) and are additionally secured to the wheel rim portion by the hanger elements 13 that are attached to shanks 14 on the cone elements 11 and bolts 15 engaging with the outer rim plate 8. A housing plate 16 is secured to the rim plate 8 by the several bolts 15 and thereby forms a portion rigid with the rim plate 8 and incloses the entire working mechanism of the device.

The hub cone element is in the form of a triangular shaped collar or three legged spider 17 centrally secured on a thimble 18 which is splined on the hub, and having its distal portions 19 apertured as shown in Fig. 3. The apertured portions 19 have their inner rims beveled as at 20 and engage with the surfaces of the three cone elements 11, as shown in Fig. 2. The hub collar or cone carrying element 17 is held in close contact with the cone elements 11 of the wheel rim by the spring 21, and through the tension of this spring said cone elements (11 and 20) are held in proper co-operative relation.

An adjustable collar 22, screw-threaded on the hub portion 5, serves for regulating the tension of said spring. And the removable housing plate 16 readily permits of access for adjusting said collar 22, as will be understood.

It will therefore be seen from the foregoing that any motion or shock of the shaft or axle will transmit a like movement to the wheel hub through the medium of the coacting cones, and that such transmission will be flexible or resilient in nature. And it will be further seen that any jarring motion imparted to the wheel will be resiliently taken up by the co-operating cone elements together with the spring.

The invention is not to be understood as being limited to the details of construction herein shown and described, as these may be varied widely without departing from the spirit of the invention.

Having thus described my invention what I claim is:

1. In a combined resilient transmission and bearing for vehicle wheels, the combination of a hub portion, a wheel rim portion mounted to have limited relative movement thereon, a member mounted to have axial movement on the hub portion and provided with perforated projections carrying wedge elements within their perforations, other wedge elements fixedly mounted on the rim portion cooperable with the wedge elements of said member, and resilient means normally holding said wedge elements in cooperative relation, substantially as set forth.

2. In a combined resilient transmission and bearing for vehicle wheels, the combination of a hub portion, a wheel rim portion, a guide plate for the wheel rim portion mounted to have limited relative movement with respect to the hub portion, a collar mounted to have axial movement on the hub portion and provided with perforated projections having cone elements within their perforations, other cone elements fixedly mounted on the rim portion, cooperable with said collar cone elements, and a spring holding the cone elements in cooperative relation substantially as set forth.

In testimony whereof I affix my signature.

BENJAMIN F. SEYMOUR.